(12) United States Patent  (10) Patent No.: US 7,781,700 B2
Harris  (45) Date of Patent: Aug. 24, 2010

(54) USER INTERFACE FOR WELDING POWER SUPPLY

(75) Inventor: James Alan Harris, Painesville, OH (US)

(73) Assignee: Lincoln Global, Inc., Monterey, CA (US)

( * ) Notice: Subject to any disclaimer, the term of this patent is extended or adjusted under 35 U.S.C. 154(b) by 344 days.

(21) Appl. No.: 11/857,613

(22) Filed: Sep. 19, 2007

(65) Prior Publication Data

US 2009/0071949 A1 Mar. 19, 2009

(51) Int. Cl.
B23K 9/10 (2006.01)
(52) U.S. Cl. ............... 219/130.5; 219/130.51; 219/137 PS
(58) Field of Classification Search ............. 219/130.1, 219/130.32, 130.33, 130.5, 130.51, 136, 219/137 PS
See application file for complete search history.

(56) References Cited

U.S. PATENT DOCUMENTS

| 4,973,814 | A | * | 11/1990 | Kojima et al. ............... 219/110 |
| 5,278,390 | A | | 1/1994 | Blankenship |
| 6,096,994 | A | | 8/2000 | Handa et al. |
| 6,476,354 | B1 | * | 11/2002 | Jank et al. ............... 219/137 PS |
| 6,700,097 | B1 | * | 3/2004 | Hsu et al. ................ 219/130.5 |
| 7,107,118 | B2 | | 9/2006 | Orozco et al. |
| 7,220,941 | B2 | * | 5/2007 | Niedereder et al. ......... 219/132 |
| 2002/0113045 | A1 | * | 8/2002 | Blankenship et al. .. 219/130.33 |

FOREIGN PATENT DOCUMENTS

DE 93 01 390 U1 4/1993

OTHER PUBLICATIONS

Search Report for corresponding PCT International Application No. PCT/IB2008/002356, dated Feb. 20, 2009.

* cited by examiner

*Primary Examiner*—Tu B Hoang
*Assistant Examiner*—Brian Jennison
(74) *Attorney, Agent, or Firm*—Hahn Loeser + Parks LLP

(57) ABSTRACT

A welding power supply includes a user interface that allows the operator to adjust one or more welding parameters comprising a welding sequence for a welding process. The user interface may include a display, which may be a graphical display depicting the welding sequence and the one or more welding parameters. The user interface may further dynamically depict a pictograph, icon or other graphical image showing how changes to the one or more welding parameters will affect the welding process, which in an exemplary manner may be the welding bead profile and/or the welding arc profile.

17 Claims, 12 Drawing Sheets

| PARAMETER | SYMBOL | |
|---|---|---|
| | MINIMUM | MAXIMUM |
| f ∿ AC FREQUENCY | | | ← 88, ← 88a |
| +/- AC BALANCE | | | ← 88, ← 88a |
| ⊓⊓ f PULSE FREQUENCY | | |
| HOT START | | |
| ARC FORCE | | |

FIG. 11

USER INTERFACE FOR WELDING POWER SUPPLY

TECHNICAL FIELD

The present invention pertains to controllers for welding power supplies and more particularly to controllers for welding power supplies having a graphical user interface that dynamically depicts the welding process.

BACKGROUND OF THE INVENTION

It is well known in the field of welding to adjust the parameters of a welding sequence to achieve a desired result. This may include setting the welding power supply at a specific voltage or current, or at a particular frequency. For some weldments, it may be desirable to achieve deep penetration of the weld joint whereas in another application power supply settings for deep penetration may damage or destroy the adjoined materials. Accordingly, the operator may adjust one or more welding parameters to match the material and joint configuration for a particular application.

Gas Tungsten Arc Welding (GTAW) is one well known type of welding process, known also as Tungsten Inert Gas (TIG) welding. Gas-Metal-Arc-Welding (GMAW) is another well known welding process. Stick welding is yet another type of welding. Each welding process utilizes an electrode through which power is supplied from a welding power supply to establish the welding arc. Examples of welding power supplies include phase controlled, pulse width modulated and inverter power supplies. In certain welding processes, the electrode is consumed, as in the case of GMAW or Stick welding. By way of contrast, the electrode for the TIG welding process is non-consumable. In each type of welding, the welding power supply parameters are set to control the weld cycle.

Fundamentally, welding machines in general use at least two parameters to control the welding process. These include: electrode feed rate and/or current and voltage. Some GMAW welding machines also have an inductance control that affects the response of the power source or supply. Other welding parameters may include AC balance where the duty cycle of positive voltage is greater than that of the negative voltage by a particular percentage resulting in shallower arc penetration. The converse may also be true for deeper penetration. Other aspects of the welding process including arc width, or the kind of arc produced by the welding power supply, are also affected by adjusting the welding sequence or welding profile. Proper control requires that the operating parameters be set to their optimal settings for a particular application (e.g. gas mixture used, plate thickness and joint type). Prior art welding machines have required the operator to calculate setup parameters from tables or equations. Alternatively, the settings may be set based on welder experience, or by trial and error.

If the welding operator provides erroneous data, or improperly calculates the setup parameters, poor weld quality or inefficient use of the welding machine and consumables may result. Weld quality is therefore dependent upon proper setup of the welding parameters. More experienced operators understand precisely what effects a particular adjustment in the welding profile will have on the weld joint. However, less experienced welders may experiment by adjusting the welding profile in various ways until the desired weld has been achieved. This can result in reduced quality, lost productivity and increased material costs.

What is needed is a user interface that helps the operator to understand how changes in the welding profile will affect the welding process. Visual representations are extremely useful for this purpose. A graphical display dynamically showing the effects on the arc and/or weld bead profile would assist the operator to produce a higher quality and more consistent product. The embodiments of the present invention obviate the aforementioned problems.

BRIEF SUMMARY

In one embodiment of the subject invention a user interface for controlling the output of an associated power supply includes at least a first input selector for adjusting one or more operating parameters of an associated power supply and means for depicting the effect that an associated change in the one or more operating parameters will have on the associated power supply output responsive to the adjustment of the one or more parameters.

In one aspect of the embodiments of the subject invention, the user interface includes means for indicating the setting values of the one or more operating parameters.

In another aspect of the embodiments of the subject invention, the associated power supply is an associated welding power supply, wherein the one or more operating parameters comprise a welding profile or welding sequence defining the associated welding power supply output.

In yet another aspect of the embodiments of the subject invention, means for depicting the effect that an associated change in the one or more operating parameters will have on the associated power supply output includes a display dynamically depicting a representation of at least a first welding power supply output responsive to adjustment of the one or more welding parameters, wherein the representation may be a graphical representation.

In still another aspect of the embodiments of the subject invention, the display may dynamically depict representative changes in an associated electrode arc responsive to adjustments of the one or more welding parameters.

In another aspect of the embodiments of the subject invention, the display may comprise a luminescent screen having a matrix of pixels for depicting the graphical display and/or the setting values of the one or more welding parameters.

In another embodiment of the subject invention, a welder may include a power supply having a power supply output for converting electrical power used to establish a welding arc through an associated electrode, a controller operable to adjust the power supply output responsive to a welding profile and a user interface capable of storing and/or communicating a welding profile to the controller, the user interface having at least a first input selector for adjusting one or more operating parameters of the welding profile wherein the user interface dynamically depicts changes to the welding process responsive to adjusting the one or more operating parameters.

In one aspect of the embodiments of the subject invention, the user interface facilitates real-time adjustment of the welding profile.

In another aspect of the embodiments of the subject invention, the user interface depicts representative changes to the welding bead profile responsive to changes in the one or more operating parameters, wherein the one or more operating parameters may include at least one of an AC balance parameter and a pulse frequency parameter.

In even another aspect of the embodiments of the subject invention, the user interface dynamically displays at least a first icon representing effective changes to the welding process responsive to adjustments in the welding profile.

In another embodiment of the subject invention, a method of operating a welding power supply may include providing a power supply, which may be a welding power supply, having a user interface, where the user interface has one or more input devices or selectors, displaying one or more welding profile settings, adjusting the one or more input devices thereby changing at least a first welding profile setting, and automatically depicting representative changes to the welding process responsive to changing the at least a first welding profile setting.

BRIEF DESCRIPTION OF THE DRAWINGS

FIG. 11 is a chart listing multiple parameters of the welding process and its corresponding pictograph according to the embodiments of the subject invention.

DETAILED DESCRIPTION OF THE INVENTION

Figure 1:
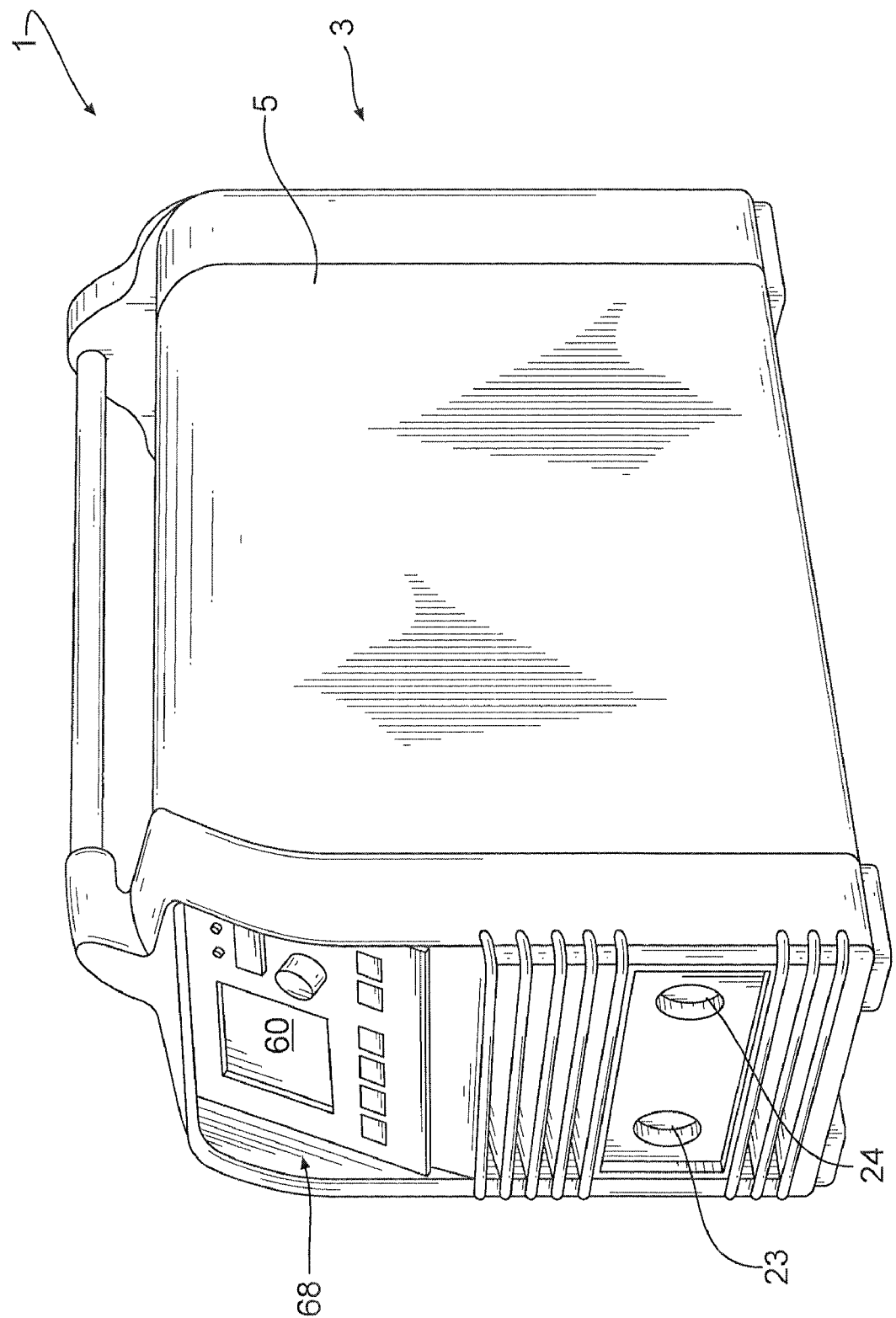
FIG. 1 is a perspective view of a welding power supply having an enhanced user interface according to the embodiments of the invention.

Referring now to the drawings wherein the showings are for purposes of illustrating embodiments of the invention only and not for purposes of limiting the same, FIG. 1 shows a welder depicted generally at 1. The welder 1 includes a power source 3 or welding power supply 3 enclosed within a housing 5. The welding power supply 3 described hereafter is exemplary in nature. Persons of ordinary skill in the art will readily understand the application of the embodiments of the subject invention to welding power supplies including both DC and AC output power as well as switched mode power supplies. Welding processes may include stick welding, gas metal arc welding (GMAW), gas tungsten arc welding (GTAW) and the like. The welding power supply 3 is illustrative as a switching inverter and is not intended to be limiting in any way. In the current embodiment, three phase power 6, shown by input power lines L1, L2 and L3 schematically represented in FIG. 2, may be directed to a power source rectifier 8 that produces an output signal through conductors 10, of which a DC signal may be directed to the input of an inverter 13. The inverter 13 may include a transformer 15 having primary and secondary windings in a manner well known in the art. Output from the secondary windings may be directed to rectifier 18 providing positive and/or negative supply power to power output terminals 23a, 24a, respectively, which may be connected to studs 23, 24. The welding power supply 3 may further include a power output controller 27, hereinafter referred to as controller 27, electrically communicated to the rectifier 18 for controlling output power at the studs 23, 24 during the welding process. In one embodiment, the controller 27 may include a pulse wave modulator 27'. The controller 27 may function to switch power on and off at a particular rate delivering power in the form of a square wave. The controller 27 may also be capable of alternating power delivered to the studs from between negative and positive within a range of frequencies suitable for numerous types of welding applications. It is noted here that any means for controlling power used to establish the welding arc may be chosen as is appropriate for use with the embodiments of the subject invention. Welding cables 33, 34 may be connected to the welding power supply 3, and more specifically to the studs 23, 24, for delivering welding current to a work piece 51, through an electrode 45, and work piece connector. In the case of TIG welding, the electrode 45 may comprise a generally non-consumable core made of Tungsten or other material. Alternatively for Gas Metal Arc Welding (GMAW), the electrode 45 may include welding wire 37 supplied from a continuous source, such as a wire feeder, not shown. A contact tip 39 may function to retain the electrode 45 which may be connected to a first welding cable 33. Accordingly, welding cable 34 may include a work piece connector for electrically connecting the welding cable 34 to the work piece 51. Of course, persons of ordinary skill in the art will understand that the electrodes for stick welding, TIG, GMAW and the like will vary with each process.

Figure 2:
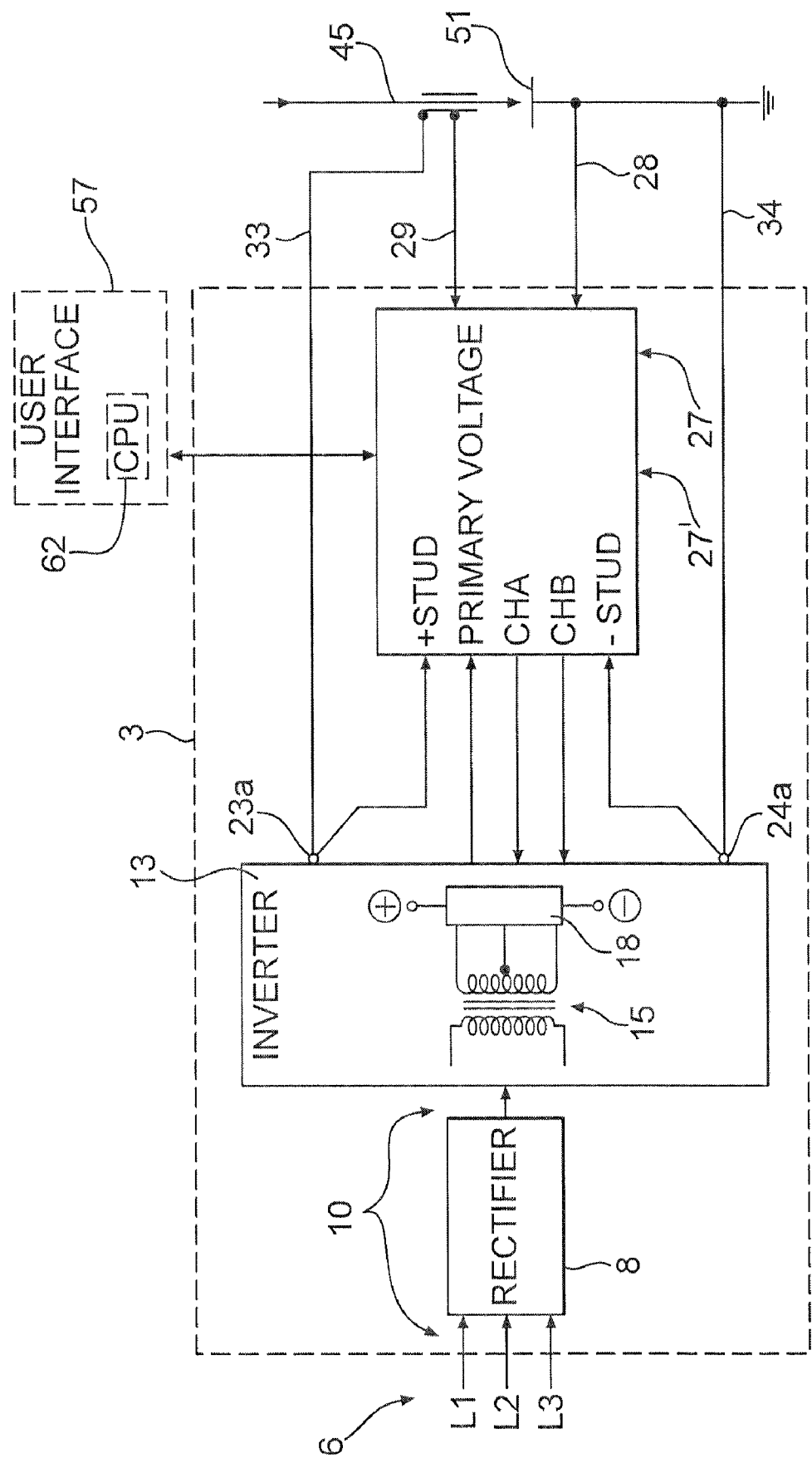
FIG. 2 is a schematic representation of a welding power supply including the power supply controller and enhanced user interface according to the embodiments of the invention.

With continued reference to FIG. 2, output from the rectifier 18 may be controlled via switching devices, which may be semiconductor switching devices such as SCRs (Silicon Controlled Rectifiers) or any other switching device chosen with sound engineering judgment. Multiple switching devices oriented in a bridge configuration may be utilized. The rate and order at which the switching devices are turned on and off may be controlled by controller 27. In this manner, signals from the controller 27 may cause the semiconductor switching devices to cycle at predetermined intervals, which may result in a waveform, as determined by the welding profile adjusted during machine setup. To facilitate control over the semiconductor switching devices, the controller 27 may incorporate a digital signal processor, which may utilize a logic processor for controlling the intervals at which the semiconductor devices are cycled. In one embodiment, the logic processor may comprise a microprocessor and static and/or dynamic memory, as well as additional peripheral support circuitry, for storing and logically processing various data. A programmed algorithm may also be incorporated into the controller 27 and executed by the microprocessor for controlling the output waveform. To monitor the welding power supply 3, voltage sense leads 28, 29 may be connected to the electrode 45 and work piece 51, respectively. Feedback signals from the sense leads may be communicated to the controller 27 for use in adjusting the power output signal in compensating for power losses as may be incurred, for example, from the welding cables, switching devices and the like. In this way, a welding sequence or a welding profile may be implemented to control the current across electrode E and work piece W at each instance of the welding process. Operation of the welder 1 in this way will successfully control the inverter 13 by way of controller 27 to produce the desired waveform in the welding process.

Figure 3:
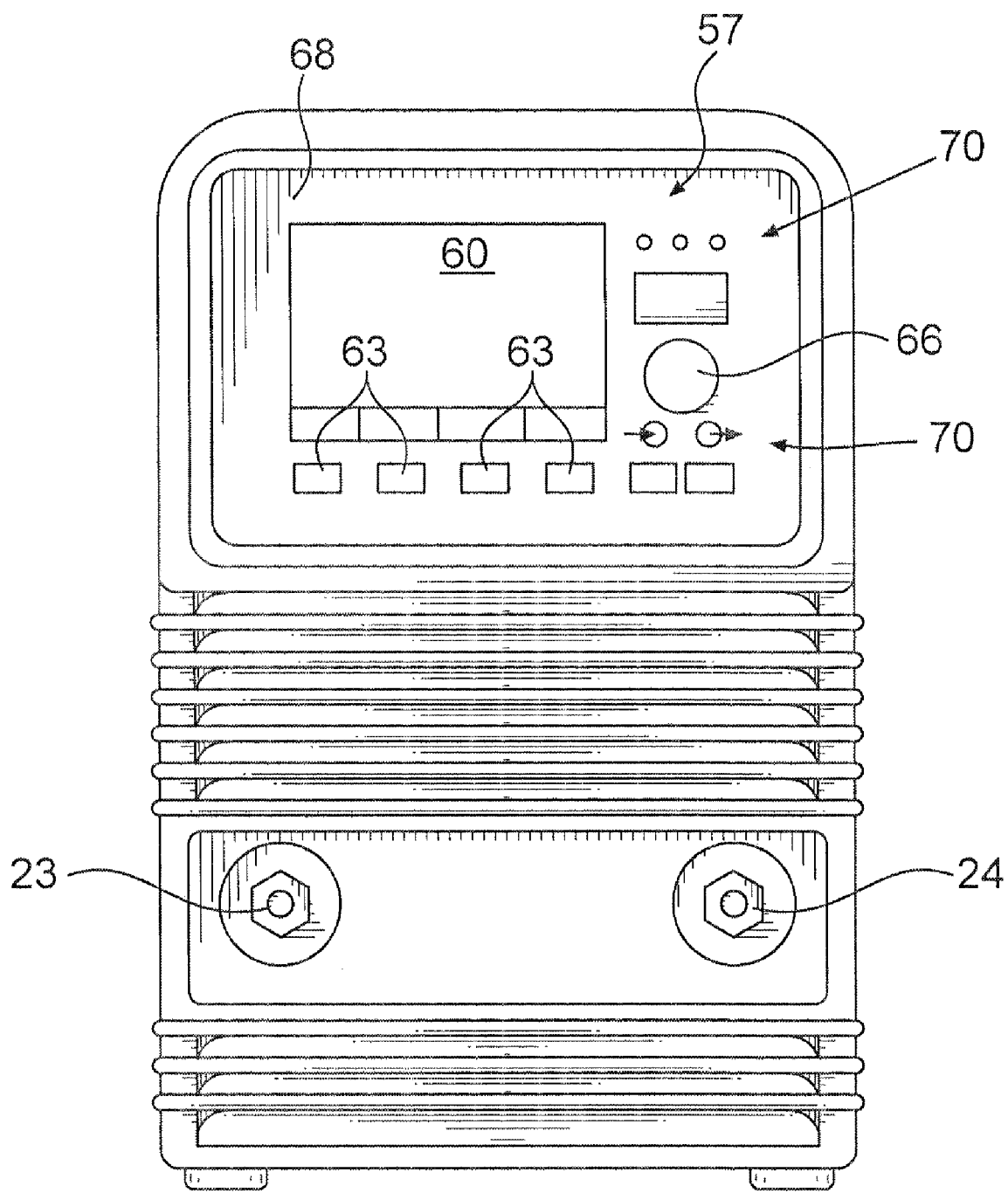
FIG. 3 is a front view of a welding power supply showing the operator panel and user interface according to the embodiments of the invention.
Figure 4:
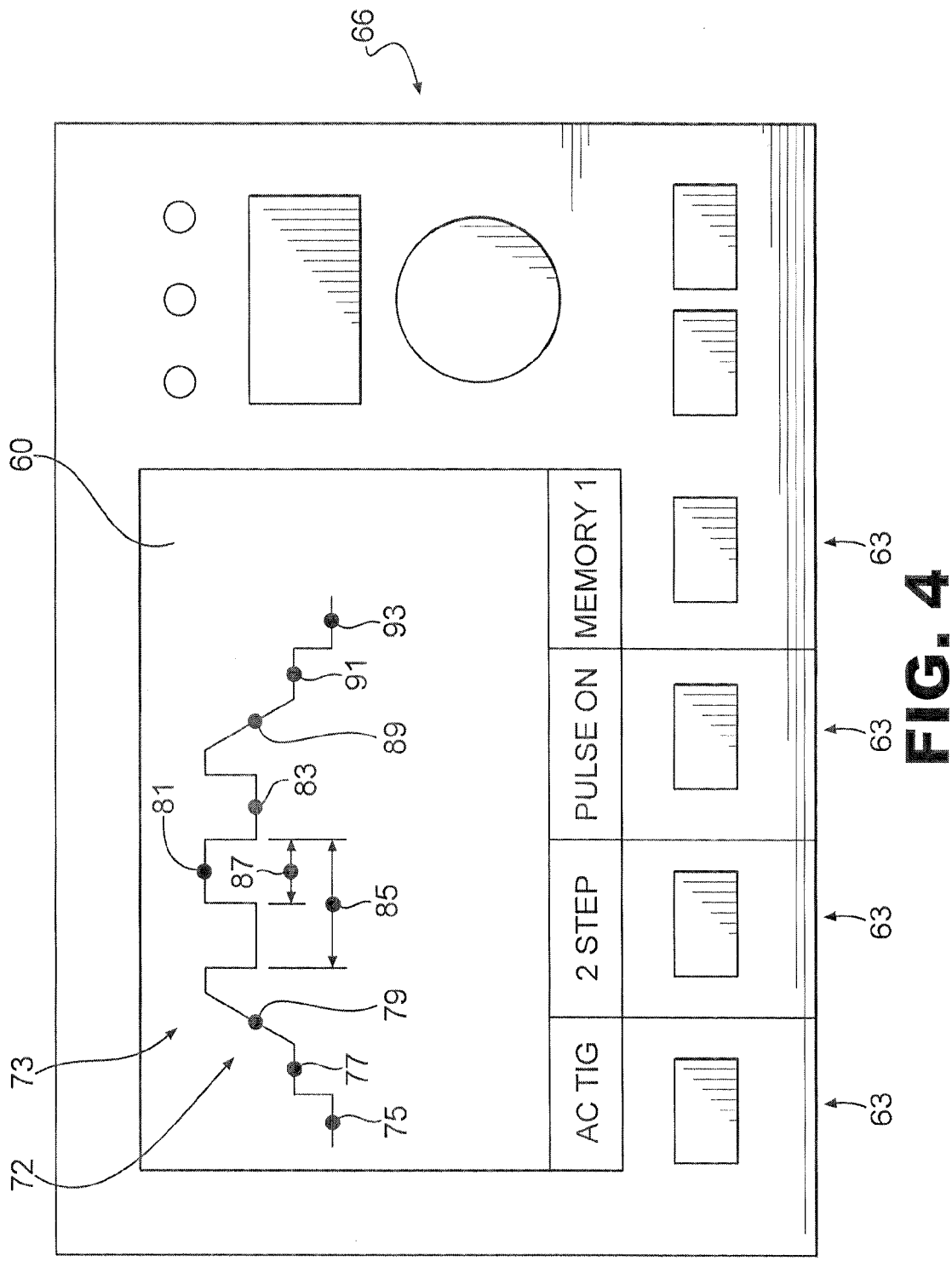
FIG. 4 is a pictorial representation of an enhanced user interface showing a welding profile according to the embodiments of the invention.

With reference now to FIGS. 3 and 4, the welder 1 may include a user interface 57 for adjusting one or more parameters of the power supply 3 in establishing and maintaining the welding arc. The user interface 57 may include a display 60 received into a console 68 for housing the display 60. The display 60 may include a luminescent screen having an array or matrix of pixels for depicting text and/or graphical images. The display 60 may be activated by electronic circuitry including display memory and a logic processor 62 or microprocessor 62. It is noted here that the microprocessor 62 used for the display 60 may be a separate microprocessor from that used in the controller 27. The display 60 may further include soft keys 63 used to enter information into the user interface 57 for selecting the mode and/or adjusting the profile of the welding cycle. As soft keys in general are programmable, other welder 1 functions may be selected or initiated by depressing the same soft key 63 at different times during machine set up or operation. For example, soft key 63a may at one time be programmed to pulse activate the pulse mode for TIG welding while at another time the same soft key 63a may be used to save default memory settings. Any manner of programming the soft keys 63 may be chosen as is appropriate for use with the embodiments of the present invention. Additionally, an input selector 66 may be integrated into the console 68. The input selector 66 may be a rotary input selector 66 connected to an encoder for entering information into the user interface 57. Other input switches 70 or indicators may be included as is appropriate for use with the embodiments of the present invention. It is noted here that any type and/or configuration of display 60 and user input devices may be utilized without limiting the scope of coverage of the embodiments of the present invention.

With continued reference to FIG. 4, the display 60 may depict a graphical representation 72 of the welding profile 73, also known as the welding sequence 73 used in a particular welding process. In an exemplary manner, the graphical representation 72 may display a series of welding parameters that can be readily adjusted for use in a TIG welding process. The current embodiment is not to be construed as limiting but rather persons of ordinary skill in the art will understand its application to other types of welding processes including but not limited to GMAW, stick welding and/or any type of welding process. The graphical representation 72 may depict a series of welding parameters comprising the welding profile 73 arranged in a line-graph configuration. Other types of graphical representations 72 may include text only depictions describing the welding parameters. However, any form of textual or graphical representations 72 may be included as chosen with sound engineering judgment for conveying information to the operator about the welding profile 73. Soft keys 63 may be used to select a particular mode of operation. Accordingly, the graphical representation 72 may change depicting only those parameters relevant to the mode selected.

Figure 5:
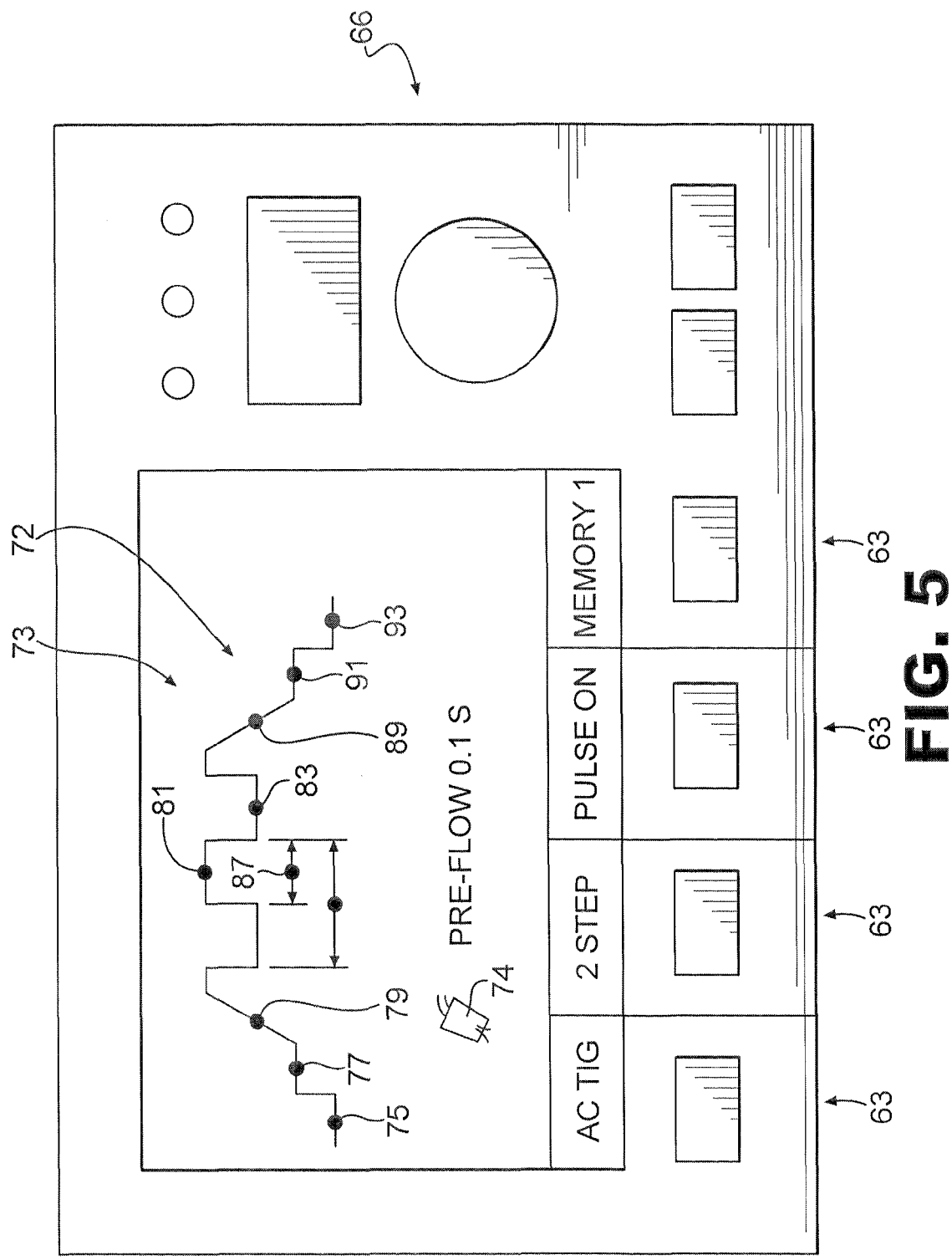
FIG. 5 is a pictorial representation of an enhanced user interface showing one operating parameter of a welding profile according to the embodiments of the invention.
Figure 6:
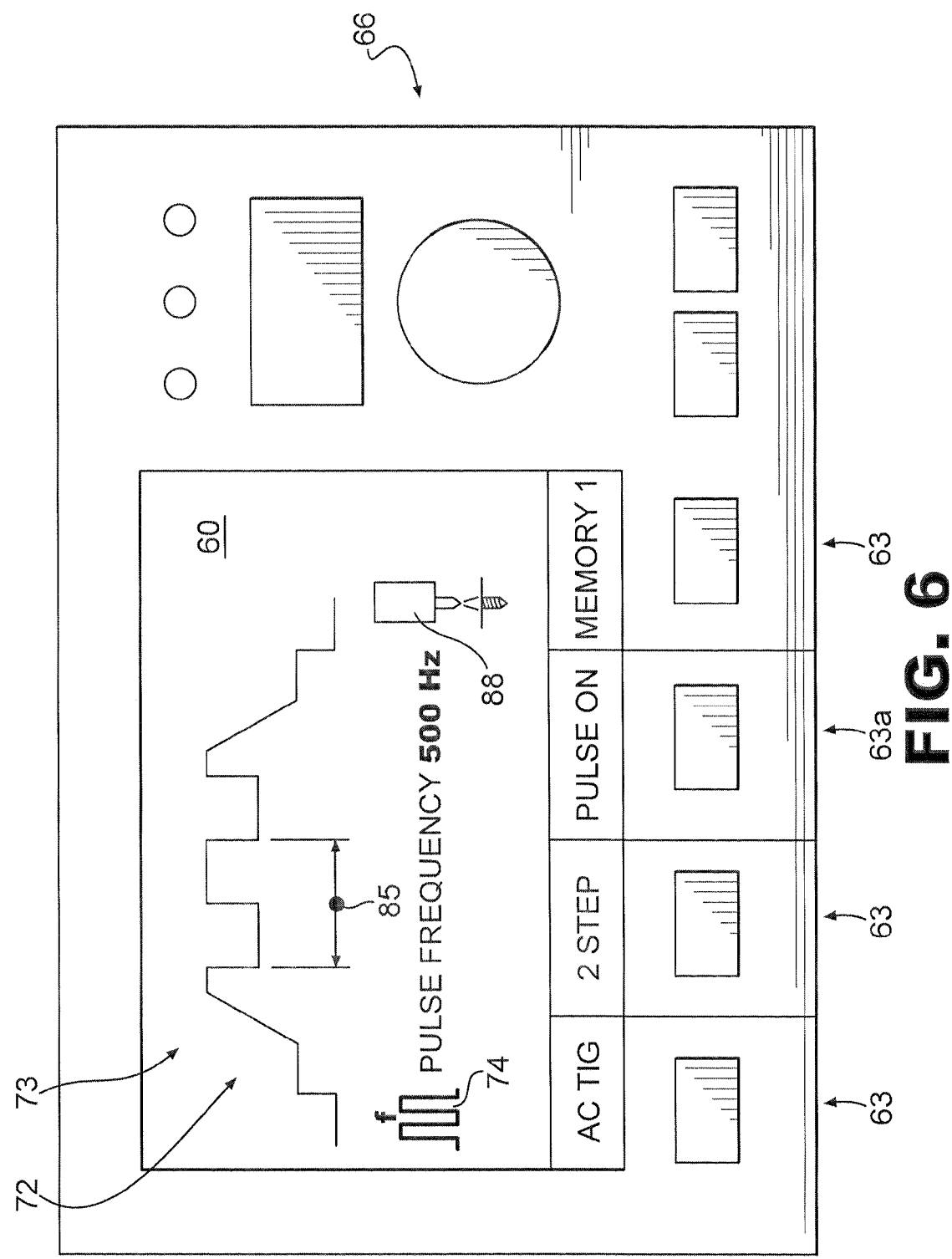
FIG. 6 is a pictorial representation of an enhanced user interface showing another operating parameter of a welding profile according to the embodiments of the invention.

Referencing FIGS. 5 and 6, to illustrate operation of one embodiment of the user interface 57, the operator may select, for example, the soft key 63 entitled "AC TIG" representing the TIG welding mode using alternating current. Additionally, the operator may select "PULSE ON" for setting the welder to operate in the pulsed current mode. Accordingly, the display 60 may depict a graphical representation 72 showing one or more TIG welding parameters which may include: Pre-Flow 75, Start Current 77, Upslope 79, Peak Current 81, Background Current 83, Frequency 85, On-Time Peak percentage 87, Downslope 89, Finish Current 91, Post-Flow 93, AC Frequency 95, and AC Balance 97. To access the various parameters for the purpose of changing its value, the operator may depress the input selector 66 to highlight a particular parameter. Accordingly, the operator may cycle through the entire welding sequence by subsequently depressing the input selector until the desired welding parameter is highlighted. For example, the operator may depress the input selector 66 until the Pre-Flow 75 parameter is highlighted, illuminated or otherwise indicated. Upon rotating the input selector, the user interface 57 may change the value of the Pre-Flow 75 setting and display it in a region of the display screen below the graphical representation 72. An icon 74 representing that particular welding cycle parameter may also be displayed, in this instance with a time increment. For this particular parameter, the Pre-Flow 75 setting displays the amount of time that welding gas is turned on prior to initiating the welding arc. When rotated, the input selector 66 will change the time setting within a predetermined range resulting in a change of how long the gas is turned on before the arc is initiated. Depressing the input selector 66 again may lock in the new Pre-Flow setting and/or highlight the next welding parameter in the welding sequence. In another example, (reference FIG. 6) the operator may depress the input selector 66 to highlight the Frequency parameter 85. The current frequency setting may then appear proximate to the welding profile 73 along with its corresponding icon 74. In a similar manner, rotating the input selector 66 will adjust the frequency setting value. A pictograph 88 may also appear on the user interface display 60 depicting the effect that adjusting the setting will have on the welding process as will be discussed further in a subsequent paragraph. It is noted here that any type of input device or any sequence and/or method of activating the input devices may be used to adjust the welding profile 73. Once activated, the welding power supply 1 may cycle through the welding profile 73 as set up by the operator for a particular application implementing the sequence and values of the operating parameters.

Figure 7:
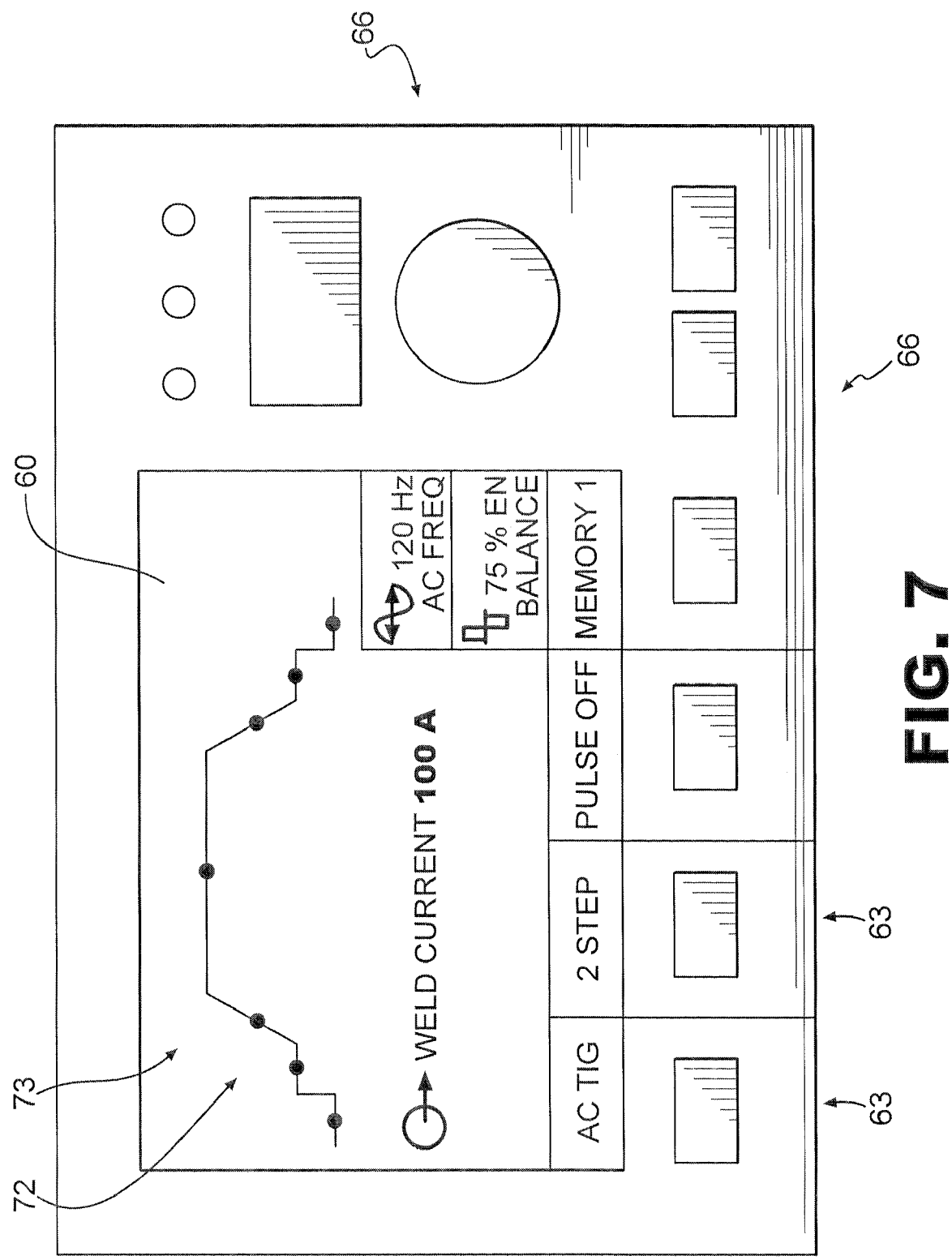
FIG. 7 is a pictorial representation of an enhanced user interface showing one mode of welder operation according to the embodiments of the invention.

FIG. 7 shows an updated display of the welding profile 73 with the "PULSE" mode deselected, i.e. turned off. The display 60 dynamically updates the depicted image showing the new welding profile 73. With the "PULSE" mode turned off, there is no pulse frequency setting. Accordingly, the graphical representation 72 may be dynamically updated depicting a different welding profile 73, one in which there is no parameter for the pulse frequency. In this manner, the display 60 may be automatically updated with changes to the graphical representation 72 based upon the selected mode of operation.

As previously mentioned, less experienced operators or welders may not be aware of how adjusting one or more of the welding parameters will effect the welding operation and more particularly, weld quality. Accordingly, the user interface 57 may dynamically display a representation of the welding process. This representation may include, for example, a profile of the welding arc and/or the bead profile. It is to be construed that any aspect of the welding process may be depicted by the user interface 57 as is appropriate for use with the embodiments of the present invention. It should also be noted that the display 60 may depict multiple aspects of the welding processes. In particular, a pictograph 88 may be displayed below the welding profile 73, which may be based in part, on the welding mode of operation selected. To show the operator how changes in the welding profile 73 will impact the welding process, the user interface 57 may show incremental changes to the pictograph 88 responsive to changes in the welding profile 73. In other words, as the operator changes the setting for a particular welding parameter, the corresponding pictograph 88 representing the welding process may automatically change in proportion to the setting adjustments. It is to be understood that any form of displaying or representing how changes in the welding profile 73 will affect the welding process may be chosen with sound engineering judgment, including, but not limited to visual representations, textual representations, audible representations, and the like.

The pictograph 88 may be comprised symbols 88a that represent the welding output and/or its effect on the weldment. In one embodiment, the symbols 88a may include graphical representations of a welding electrode, the outline of welding arc, the bead profile and/or the joint configuration. However, any symbol may be included in the pictograph 88 that represents the welding process without limitation. The electrode symbol 88a may match the type of welding process selected by the operator, like for example Stick Welding. Accordingly, a different electrode symbol 88a may appear for GMAW or TIG welding. It will be appreciated that any symbol 88a for the electrode may be depicted corresponding to the particular mode of welding operation selected. Other symbols 88a or portions of the pictograph 88 may change incrementally with respect to changes in the welding parameters. For example, the outline of the welding arc may widen or narrow. Alternatively, or in combination therewith, the weld bead may widen or narrow. The bead may also grow shallower or deeper. It is to be construed that any aspect of the welding process may be communicated and dynamically updated to show the operator how adjusting the welding profile 73 will effect the end result.

With reference now to FIG. 11, not every welding parameter may have a corresponding pictograph 88 that dynamically represents changes to the welding output or welding process. For example, in one embodiment, five (5) welding parameters may be included to have corresponding symbols that dynamically represent changes in the welding output. These may include: AC Frequency, AC Balance, Pulse Frequency, Hot Start and Arc Force. This list of parameters should not be construed as limiting but rather exemplary in nature. Rather, any welding parameter in the welding sequence, for any type of welding process, may have an accompanying pictograph 88 that represents changes to the welding output.

Figure 8:
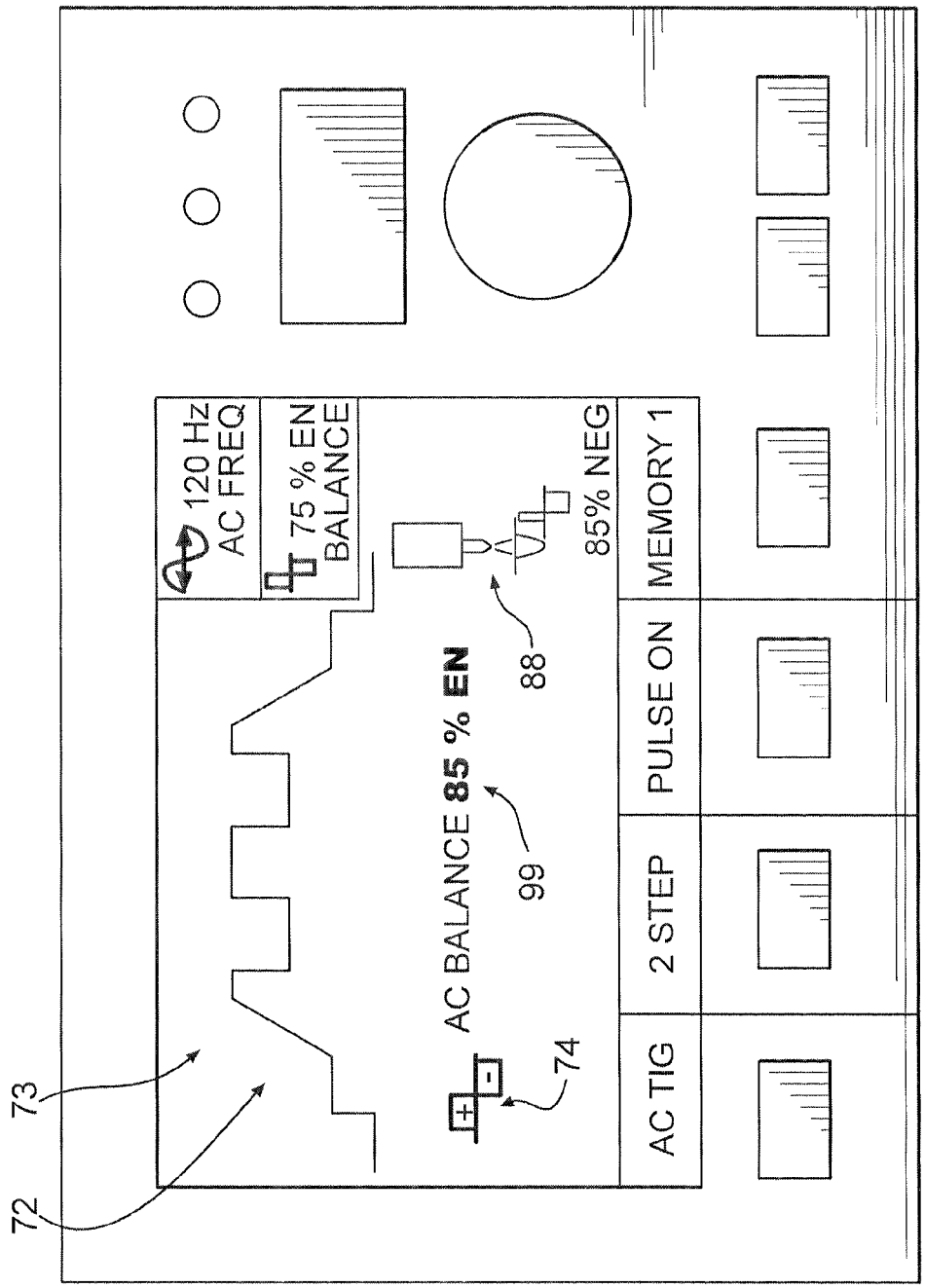
FIG. 8 is a pictorial representation of an enhanced user interface showing a pictograph according to the embodiments of the invention.
Figure 8A:
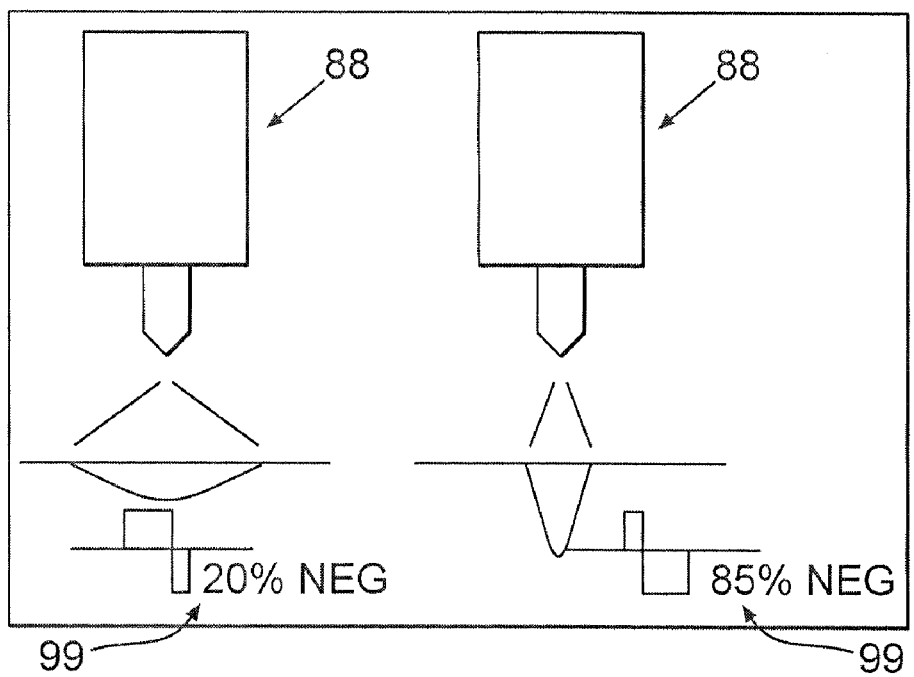
FIG. 8a is a pictorial representation of an enhanced user interface showing dynamic changes to the pictograph according to the embodiments of the invention.
Figure 9A:
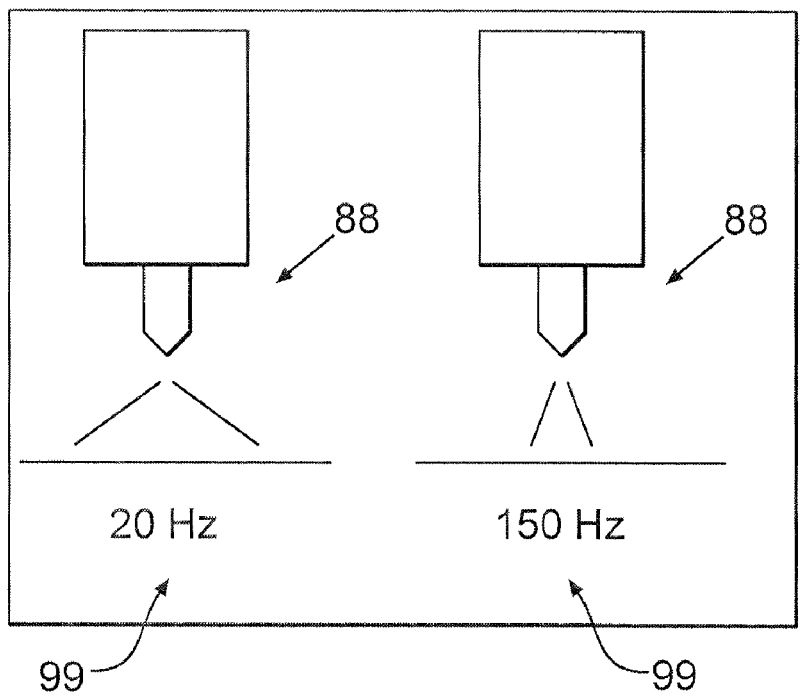
FIG. 9a is a pictorial representation of an enhanced user interface showing dynamic changes to the pictograph according to the embodiments of the invention.
Figure 9:
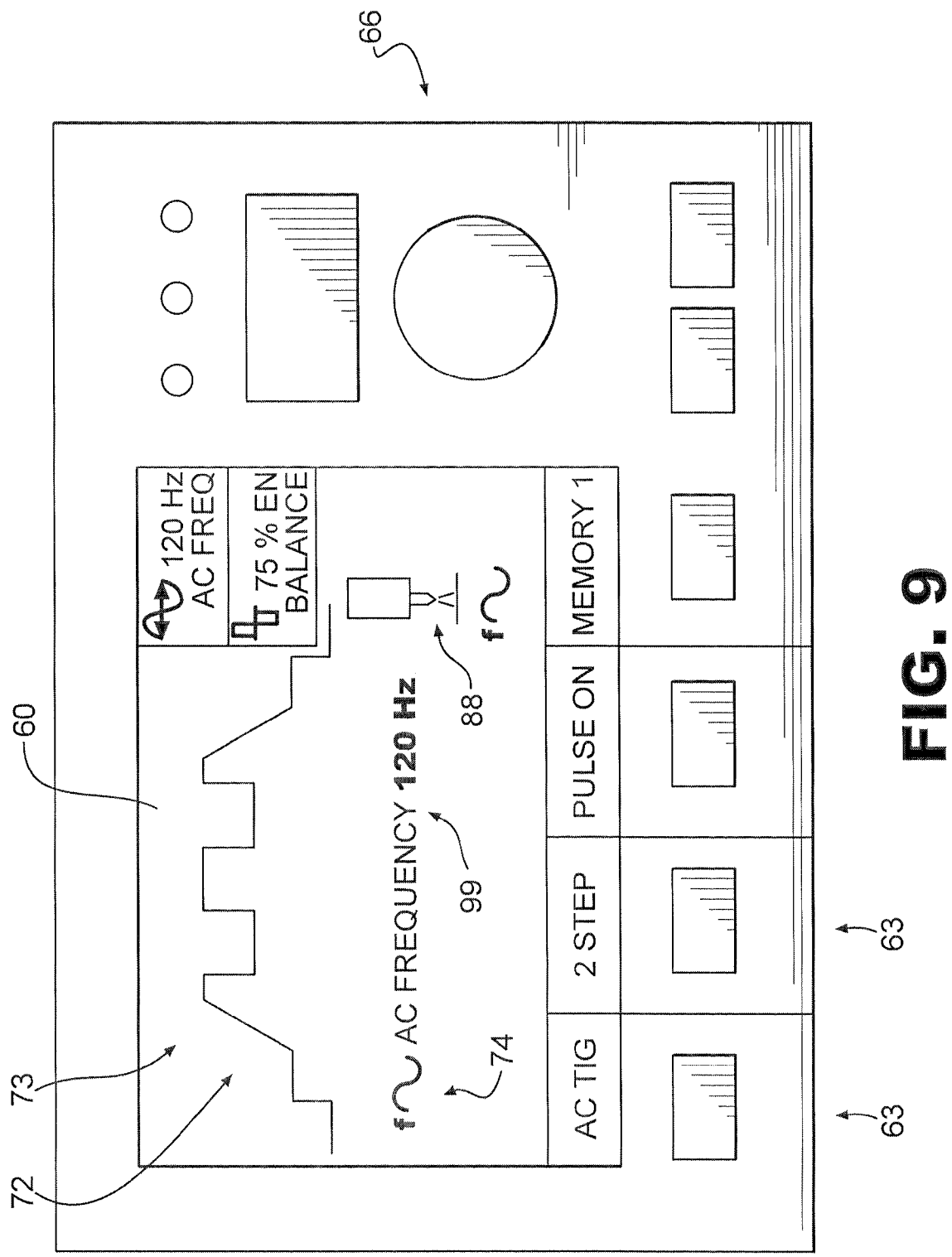
FIG. 9 is a pictorial representation of an enhanced user interface showing a pictograph according to the embodiments of the invention.
Figure 10:
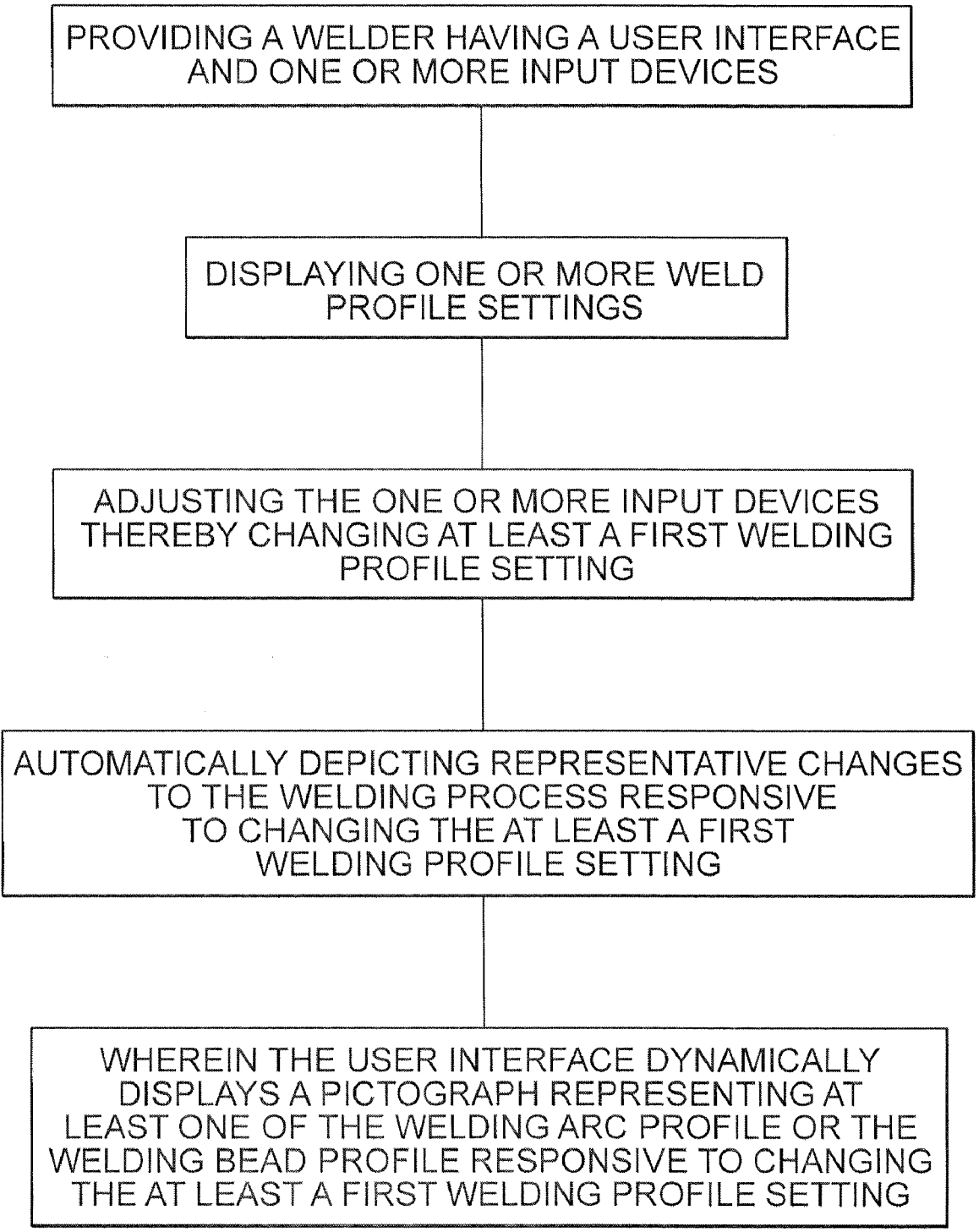
FIG. 10 is a flow chart showing the method of operating a welder according to the embodiments of the invention.

With reference now to FIGS. 8 through 9a, by way of illustration FIG. 8 shows that the AC Balance parameter has been selected for adjustment. FIG. 9 depicts a different welding parameter namely the AC Frequency. In each example, a setting value 99 for that parameter is displayed as shown on the screen in a manner consistent with that described above. In one embodiment, the setting value 99 is represented by alpha-numeric text. However, any means for depicting the setting value 99 may be chosen including, but not limited to, a bar graph or other graphical icon. When the particular welding parameter is selected, the corresponding pictograph 88 may be automatically displayed on the screen. The pictograph 88 may represent the weld bead profile, as shown in FIG. 8a, and/or welding arc, as shown in FIG. 9a. It is to be understood that the user interface 57 may be constructed and/or programmed to automatically display the particular pictograph 88 when the corresponding operating parameter has been selected without interaction by the operator. It is noted here that while any aspect of the welding process may be represented by the pictograph 88, only those aspects or characteristics of the welding process affected by the particular welding parameter may be represented in the pictograph 88. For example, the AC frequency 95 setting is known to affect the width of the welding arc. Accordingly, as the operator increasingly adjusts the AC frequency 95 setting, pictograph 88 may dynamically depict a narrower welding arc to show the operator the resultant effect. It follows that as the AC frequency 95 setting decreases the pictograph 88 showing the arc width dynamically and proportionately widens. Similarly, FIG. 8a shows how the AC Balance impacts the welding process, which in this case relates to the bead depth. It is contemplated in an alternative embodiment that the display 60 may depict more than one pictograph 88 or a single pictograph 88 showing multiple aspects of the welding process. Accordingly, the pictograph 88 may display any aspect of the welding process, including aspects related to particular modes of welding operation.

By dynamically, it is meant that the display 60 may be automatically and constantly updated responsive to changes in a particular welding parameter setting. As such, the user interface 57 may track the changes made to the welding profile by the operator in real time and continuously display an updated pictograph 88 in response thereto. It is noted that any manner of depicting or representing welding process may be chosen as is appropriate for use with the embodiments of the subject invention including but not limited to alpha-numeric representations.

With reference now to all of the Figures, operation of the welder 1 will now be discussed. The operator may turn on the welder 1, which may subsequently activate the display 60 on the user interface 57 depicting the operating status of the welder 1. Once initialized, the user interface 57 may prompt the operator for an input. The operator may then select the desired mode of welding operation appropriate for the current welding application. Upon engaging one or more of the input selectors, the user interface 57 may update the display 60 with the graphical representation depicting the welding profile associated with that particular mode of operation. In one embodiment, the operator may load a welding profile previously configured from another welding operation and/or modified by another operator. In another embodiment, the user interface 57 may prompt the operator to enter a new welding profile. In any instance, the operator may select an operating parameter by activating one or more of the input devices after which an icon associated with that particular operating parameter may be presented on the display 60. The user interface 57 may also display a pictograph 88 showing a corresponding representation of one or more characteristics of the welding process associated with that particular operating parameter. Upon engaging the input selector 66 thereby changing that operating parameter, the user interface 57 may dynamically update the operating parameter's setting value responsive to the operator's input. Additionally, the user interface 57 may also dynamically update the pictograph 88 responsive to the operator's input showing how the changes to the operating parameter will affect the welding process. In an exemplary manner similar to that described above, the display 60 may depict a narrowing or widening pictograph 88 responsive to the operator's input. In this way, the operator can observe how changing one or more of the operating parameters will affect a particular aspect of the welding process.

The invention has been described herein with reference to the preferred embodiment. Obviously, modifications and alterations will occur to others upon a reading and understanding of this specification. It is intended to include all such modifications and alternations insofar as they come within the scope of the appended claims or the equivalents thereof.

The invention claimed is:

1. A user interface for an associated welding power supply having output power used to establish a welding arc for an associated welding process, comprising: in combination with an arc welder
 at least a first input selector communicated to the associated welding power supply for adjusting the output power; and
  wherein the at least a first input selector is operable to modify the value of one or more operating parameters of the associated welding power supply;
  means for indicating the values of the one or more operating parameters,
 means for representing the effect that a change in the output power has on the associated welding process and wherein said means for representing comprises:
  a pictograph that dynamically depicts changes to a welding arc as it interfaces to a workpiece, wherein the pictograph provides a simulation of real world parameters of the associated welding process that is responsive to adjusting the one or more operating parameters.

2. The user interface as defined in claim 1, wherein said means for representing the effect that a change in the output power has on the welding process, comprises:
 a display dynamically depicting a representation of at least a first welding power supply output.

3. The user interface as defined in claim 2, wherein
 the display depicts a pictograph that incrementally changes responsive to adjustment of the one or more operating parameters.

4. The user interface as defined in claim 2, wherein
 the display graphically depicts representative changes to a welding bead responsive to adjusting the one or more operating parameters.

5. The user interface as defined in claim 2, wherein
 the display comprises a luminescent screen having a matrix of pixels for depicting the representation.

6. The user interface as defined in claim 2, further comprising:
 a logic processor operatively communicated to dynamically update the display responsive to changes in the values of the one or more operating parameters.

7. The user interface as defined in claim 6, further comprising:
 memory operatively communicated to the logic processor for storing at least a first portion of the values of one or more operating parameters.

8. An arc welder, comprising:
 a power supply for converting electrical power used to establish a welding arc through an associated electrode, the power supply having a power supply output;
 a controller operable to adjust at least one operating parameters associated with the power supply output responsive to a welding sequence;
 a user interface operatively connected to the controller, wherein the user interface is operable to modify the welding sequence; and,
 wherein the user interface displays a pictograph that dynamically depicts simulated real world changes to a welding process on a workpiece, wherein the pictograph is responsive to adjusting one or more operating parameters.

9. The welder as defined in claim 8, further comprising:
 at least a first input selector communicated to the user interface for adjusting one or more operating parameters of the welding profile.

10. The welder as defined in claim 9,
 wherein the user interface facilitates real-time adjustment of the welding profile.

11. The welder as defined in claim 10, wherein the welding profile includes one or more operating parameters; and,
 wherein the one or more operating parameters include at least one of: an AC balance parameter, a pulse frequency parameter, an AC frequency parameter, a hot start parameter and an arc force parameter.

12. The welder as defined in claim 9,
 wherein the user interface depicts representative changes to a welding bead profile responsive to changes in the one or more operating parameters.

13. The welder as defined in claim 9,
 wherein the user interface depicts representative changes to the welding arc width responsive to changes in an AC frequency parameter.

14. The welder as defined in claim 9,
 wherein the user interface dynamically displays at least a first pictograph representing changes to the welding process responsive to adjustments in the welding sequence.

15. The welder as defined in claim 14,
 wherein the user interface includes a logic processor and a display screen depicting the at least a first pictograph.

16. A method of operating a welding power supply, comprising the steps of:
 providing a welding power supply having a user interface, the user interface having one or more input selectors;
 displaying one or more welding sequence settings;
 engaging the one or more input selectors thereby changing at least a first welding sequence setting; and,
 automatically depicting representative changes to a pictograph responsive to changing the at least a first welding profile setting
 wherein the step of automatically depicting representative changes to the welding process, comprises the step of:
 dynamically displaying the pictograph to show at least one of a welding arc profile or a welding bead profile on a workpiece, wherein the pictograph provides a simulation of real world parameters of a welding process, which is responsive to changing the at least a first welding profile setting.

17. The method as defined in claim 16, wherein the at least a first welding profile setting is selected from the group comprising:
 gas pre-flow, start current, upslope current, peak current, background current, frequency, on-time peak percentage, downslope current, finish current, post-flow, AC frequency, and AC balance.

* * * * *